United States Patent
Paternoster et al.

(10) Patent No.: US 11,192,295 B2
(45) Date of Patent: Dec. 7, 2021

(54) DEVICE AND METHOD FOR PRODUCING A THREE-DIMENSIONAL OBJECT

(71) Applicant: EOS GmbH Electro Optical Systems, Krailling (DE)

(72) Inventors: Stefan Paternoster, Andechs (DE); Stefan Grünberger, Munich (DE); Stefan Kneisel, Munich (DE)

(73) Assignee: EOS GmbH Electro Optical Systems, Krailling (DE)

( * ) Notice: Subject to any disclaimer, the term of this patent is extended or adjusted under 35 U.S.C. 154(b) by 378 days.

(21) Appl. No.: 15/767,891

(22) PCT Filed: Sep. 28, 2016

(86) PCT No.: PCT/EP2016/073118
§ 371 (c)(1),
(2) Date: Apr. 12, 2018

(87) PCT Pub. No.: WO2017/063886
PCT Pub. Date: Apr. 20, 2017

(65) Prior Publication Data
US 2018/0304527 A1    Oct. 25, 2018

(30) Foreign Application Priority Data
Oct. 13, 2015   (DE) .......................... 102015219866.9

(51) Int. Cl.
*B29C 64/153*   (2017.01)
*B33Y 10/00*   (2015.01)
(Continued)

(52) U.S. Cl.
CPC .......... *B29C 64/153* (2017.08); *B29C 64/165* (2017.08); *B29C 64/205* (2017.08);
(Continued)

(58) Field of Classification Search
CPC ... B29C 64/153; B29C 64/205; B29C 64/165; B33Y 10/00; B33Y 30/00; B33Y 40/00; B22F 2003/1056; B22F 3/1055
See application file for complete search history.

(56) References Cited

U.S. PATENT DOCUMENTS

| 5,993,554 A | 11/1999 | Keicher et al. |
| 2009/0068376 A1* | 3/2009 | Philippi ................ B33Y 40/00 427/532 |

(Continued)

FOREIGN PATENT DOCUMENTS

| DE | 102005022308 | 11/2006 |
| DE | 102007040755 | 3/2009 |

(Continued)

OTHER PUBLICATIONS

International Search Report for Application No. PCT/EP2016/073118 dated Jan. 20, 2017, 3 pages.
(Continued)

*Primary Examiner* — Jacob T Minskey
*Assistant Examiner* — S. Behrooz Ghorishi
(74) *Attorney, Agent, or Firm* — Seyfarth Shaw LLP (57) ABSTRACT

A device includes a recoater that can be moved in an application direction across a build area, the recoater having at least a first recoating unit for applying a layer of the building material to the build area and a solidification device that can be moved in the application direction across the build area, the solidification device having at least a first solidification unit for selectively solidifying the applied layer of the building material at positions that correspond to a cross-section of the object to be produced. The device can repeat the steps of applying and selectively solidifying until the object is completed. The recoater includes at least a second recoating unit that is arranged at the other side of the
(Continued)

first solidification unit than the first recoating unit with respect to the application direction.

10 Claims, 5 Drawing Sheets

(51) Int. Cl.
    *B33Y 30/00*     (2015.01)
    *B29C 64/165*     (2017.01)
    *B29C 64/205*     (2017.01)
    *B33Y 40/00*     (2020.01)

(52) U.S. Cl.
    CPC ............... *B33Y 10/00* (2014.12); *B33Y 30/00* (2014.12); *B33Y 40/00* (2014.12)

(56) References Cited

U.S. PATENT DOCUMENTS

| | | |
|---|---|---|
| 2015/0202826 A1 | 7/2015 | Paternoster et al. |
| 2016/0107387 A1* | 4/2016 | Ooba .................. B29C 64/205 264/128 |
| 2016/0114427 A1* | 4/2016 | Eibl ...................... B29C 64/268 419/7 |
| 2016/0318251 A1* | 11/2016 | Ederer ................. B29C 64/165 |
| 2017/0021452 A1* | 1/2017 | Tanaka ................ B23K 26/702 |

FOREIGN PATENT DOCUMENTS

| | | |
|---|---|---|
| DE | 102012212587 | 1/2014 |
| DE | 102015213140 | 1/2017 |
| EP | 2502729 | 9/2012 |
| EP | 3015252 | 5/2016 |
| WO | 2014208741 | 12/2014 |
| WO | 2015091485 | 6/2015 |
| WO | 2015106838 | 7/2015 |

OTHER PUBLICATIONS

International Written Opinion for Application No. PCT/EP2016/073118 dated Jan. 20, 2017, 7 pages.
Mechanical Engineering Cognition, Qiang Jianguo, p. 263, Higher Education Press, Apr. 2013.

* cited by examiner

DEVICE AND METHOD FOR PRODUCING A THREE-DIMENSIONAL OBJECT

TECHNICAL FIELD OF THE INVENTION

The present invention relates to a device and a method for producing a three-dimensional object by applying, layer by layer, and selectively solidifying a building material.

BACKGROUND OF THE INVENTION

Devices and methods of this type are used, for example, in rapid prototyping, rapid tooling or additive manufacturing. An example of such a method is known by the name "selective laser sintering or laser melting." In this method, a thin layer of a building material in powder form is repeatedly applied and the building material is selectively solidified in each layer by selective irradiation with a laser beam.

WO 2015/091485 A1 describes a device for selective laser melting, in which a bar irradiation device that is formed of a row of VCSELs (Vertical Cavity Surface Emitting Laser) or of a row of VECSELs (Vertical External Cavity Surface Emitting Laser) moves across an applied powder layer and selectively solidifies said powder layer.

The patent application DE 10 2015 213 140, which has not yet been published at the time of filing of the present invention, describes a device for producing a three-dimensional object, wherein a recoater and an irradiation device are moved together or separately from one another across a build area that is intended for the production of the object.

SUMMARY OF THE INVENTION

It is an object of the present invention to provide an alternative or improved device and an alternative or improved method for producing a three-dimensional object by layer-wise applying and selectively solidifying a building material in powder form.

The object is achieved according to the disclosed invention. Further developments of the invention are given in the respective dependent claims. The method can also be further developed by the features of the device, which features are given below or in the dependent claims, or vice versa.

The device according to the invention serves for producing a three-dimensional object by layer-wise applying and selectively solidifying of a building material. The device comprises a recoater that can be moved in an application direction across a build area, the recoater having at least a first recoating unit for applying a layer of the building material to the build area and a solidification device that can be moved in the application direction across the build area, the solidification device having at least a first solidification unit for selectively solidifying the applied layer of the building material at positions that correspond to a cross-section of the object to be produced. The device is configured and/or controlled to repeat the steps of applying and selectively solidifying until the object is completed. The recoater comprises at least a second recoating unit that is arranged at the other side of the first solidification unit than the first recoating unit with respect to the application direction. In addition to that or alternatively, the solidification device comprises at least a second solidification unit that is arranged at the other side of the first recoating unit than the first solidification unit with respect to the application direction. With such a device, for example, the time required for producing the object can be significantly reduced as compared with the case where only one recoating unit is arranged at one side of the solidification device and thus, the productivity can be increased. In the context of the invention, the recoating unit(s) and solidification unit(s) can be coordinated in their movement with one another so that idle periods can be mostly avoided.

Preferably, the device comprises two or more recoating units and two or more solidification units, wherein the recoating units and the solidification units are arranged alternately in the application direction, wherein preferably both units that are located first and last with respect to the application direction are either both a recoating unit or both a solidification unit. As a result, for example, the time required for producing the object can be further reduced, thus further increasing the productivity. It is particularly preferred (see also the formulations regarding the preferred number of recoating units as compared to the number of solidification units) that the two units located first and last with respect to the application direction, respectively, are a recoating unit each.

Preferably, the device comprises two or more recoating units and two or more solidification units, wherein at least one recoating unit is arranged between two solidification units, wherein preferably the two units that are arranged first and last with respect to the application direction are a recoating unit each. Thus, for example, the time required for producing the object can be reduced also in the case of double recoating and thus the productivity can be increased.

Furthermore, it is preferred that the number of recoating units is larger than the number of solidification units, particularly preferred larger by the number 1. This means that the number of recoating units exceeds the number of solidification units, which in particular results in financial savings: at present, solidification units are generally more expensive to provision than recoating units, as they are more complex in their functions. In addition, the entire operation can also be simplified by this measure: generally, each solidification unit must be operated actively, i.e. in particular, it must be possible to control it. This means that signal connections are assigned to each solidification unit. On the other hand, an active control of recoating units during their operation is not necessarily required, so that by providing a larger number of recoating units than solidification units a simplification of the process can also be achieved.

Preferably, the recoater and/or the solidification device is configured to apply a layer of the building material to the build area or to solidify the applied layer of the building material both upon moving in the application direction as well as upon moving in a direction opposite the application direction. In this way, for example, the device can be operated in two directions, i.e. the application direction and its opposite direction.

Preferably, the first recoating unit and/or possible further recoating units as well as the first solidification unit and/or possible further solidification units are arranged in the device so as to be adjustable in height, in particular controllable in height. In this way, for example, all those units mentioned can be set or controlled, during operation, to a height suitable for the current operation of the device.

Preferably, the solidification device is an irradiation device and the first solidification unit and possible further solidification units are irradiation units which are adapted to emit a radiation suitable for solidifying the building material. In this way, for example, solidification of the building material can be implemented by means of radiation.

Preferably, the first irradiation unit and possible further irradiation units are designed as bar irradiation devices, in particular as VCSEL-based or as VECSEL-based bar irradiation devices. This enables, for example, a particularly efficient solidification of the building material by means of radiation. In particular, reference is made in this context to the disclosure of the aforementioned WO 2015/091485 A1, the content of which is considered to be fully part of the disclosure of this invention.

Preferably, the device further comprises a height-adjustable support, which is intended to support the applied powder layers. For example, the thickness of the applied powder layer can be adjusted by lowering the support.

Preferably, the device further comprises a radiant heater to heat the applied powder layer before solidification. In this way, for example, the applied powder layer can be preheated before being solidified.

The method according to the invention serves for producing a three-dimensional object by layer-wise applying and selectively solidifying a building material. The method comprises the following steps: applying a layer of the building material by means of a recoater that moves across a build area in an application direction, the recoater having at least a first recoating unit, selectively solidifying the applied layer of the building material at positions that correspond to a cross-section of the object to be produced by means of a solidification device that moves across the build area, the solidification device having at least a first solidification unit, and repeating the steps of applying and selectively solidifying until the object is completed. The recoater comprises at least a second recoating unit that is arranged at the other side of the first solidification unit than the first recoating unit with respect to the application direction. Additionally or alternatively, the solidification device comprises at least a second solidification unit that is arranged at the other side of the first recoating unit than the first solidification unit with respect to the application direction. With such a method, for example, the time required for producing the object can be considerably reduced compared to the case in which only one recoating unit is arranged on one side of the irradiation device, thus increasing productivity.

Preferably, each recoating unit and each solidification unit is moved once in a first direction across the build area and subsequently, each recoating unit and each irradiation unit is moved once in a direction opposite the first direction across the build area in reverse order. In this way, for example, the device can be operated in two directions (i.e. in the application direction and its opposite direction).

Preferably, each recoating unit and/or each solidification unit is set higher by a predefined amount, preferably by the amount corresponding to a thickness of a layer of the building material, than the recoating unit preceding in the respective direction of movement. In this context, it is particularly preferred that at least a portion (preferably all) of the (in particular) recoating or solidification units are arranged in the device so as to be adjustable in height, as mentioned above. This allows, for example, for applying and solidifying of several layers during one pass, i.e. in the course of moving all recoating units and solidification units in one direction of movement or in the direction of movement and the opposite direction of movement.

Preferably, at least one recoating unit and at least one solidification unit are moved across the build area in such a way that an application process and a solidification process take place simultaneously at different locations of the build area. In this way, for example, the time required for producing the object can be further reduced and thus, the productivity can be further increased.

Preferably, each solidification unit is an irradiation unit that emits a radiation suitable for solidifying the building material and for each irradiation unit, a focal plane of the emitted radiation is set higher by a predefined amount, preferably by the amount that corresponds to a thickness of a layer of the building material, than the focal plane of the irradiation unit preceding in the respective direction of movement. As a result, for example, the solidification of the building material can be implemented by means of radiation and the adjustment of the focal plane can obviate the need for arranging the irradiation units in a high-adjustable manner or be additional to it.

BRIEF DESCRIPTION OF THE DRAWINGS

Further features and expediencies of the invention are set out in the description of exemplary embodiments with the aid of the attached drawings.

DETAILED DESCRIPTION OF THE EMBODIMENTS

Figure 1:
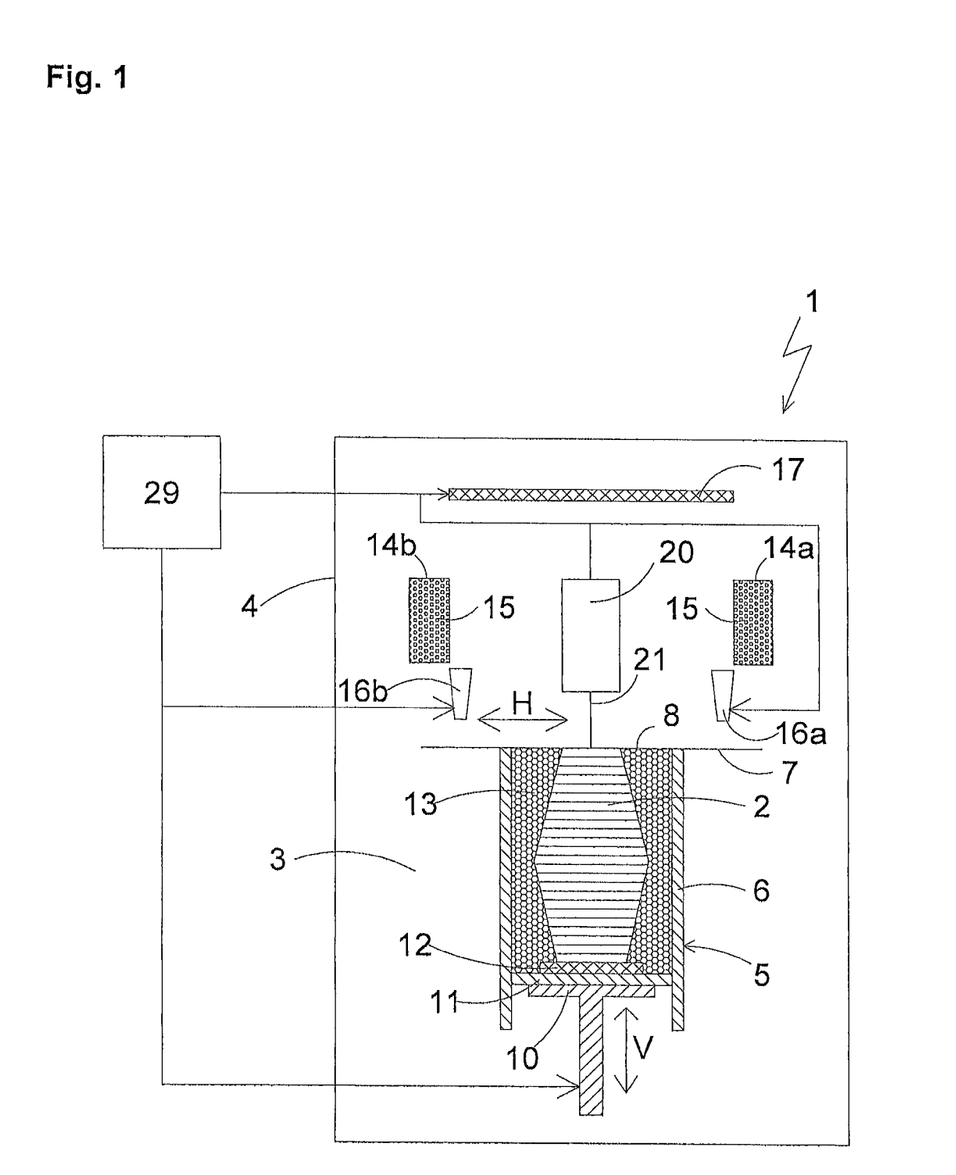
FIG. 1 shows a schematic view, partially in cross-section, of a device for producing a three-dimensional object layer by layer according to a first embodiment of the present invention.

Hereafter, a device 1 according to a first exemplary embodiment of the present invention is described with reference to FIG. 1. The device shown in FIG. 1 is a laser sintering device or laser melting device 1. For building an object 2, it comprises a process chamber 3 with a chamber wall 4.

A container 5 open to the top with a container wall 6 is arranged in the process chamber 3. A working plane 7 is defined by the upper opening of the container 5, wherein the area of the working plane 7 located within the opening, which can be used for building the object 2, is referred to as build area 8.

In the container 5, a support 10 is arranged that can be moved in a vertical direction V and to which a base plate 11 is attached which seals the container 5 at the bottom and thus forms the bottom thereof. The base plate 11 can be formed as a plate separately from the support 10 which plate is fixed to the support 10, or it can be integrally formed with the support 10. Depending on the powder and process used, a building platform 12 can also be arranged on the base plate 11 on which the object 2 is built. However, the object 2 can also be built on the base plate 11 itself, which then serves as a building platform. In FIG. 1, the object 2 to be formed in the container 5 on the building platform 12 is shown below the working plane 7 in an intermediate state with several solidified layers, surrounded by building material 13 that remained unsolidified.

The laser sintering device 1 further comprises two storage containers 14*a*, 14*b* for a building material in powder form 15, which building material can be solidified by electromagnetic radiation, and a recoater 16 which comprises two recoating units 16a, 16b that can be moved in a horizontal direction H across the build area for applying the building material 15 to the build area 8. Furthermore, a radiant heater 17 is arranged in the process chamber for preheating the building material 15 applied to the build area 8. The radiant heater 17 is designed as an infrared heater, for example.

The laser sintering device 1 further comprises an irradiation device 20 that can also be moved in the horizontal direction H across the build area and which produces a laser radiation 21 that is focused upon the working plane 7. According to the present embodiment, the irradiation device 20 comprises a single irradiation unit. Said irradiation unit 20 is preferably designed as a bar irradiation device which is capable of selectively irradiating a line that extends transversely to its direction of movement and over the entire region to be irradiated.

Furthermore, the laser sintering device 1 comprises a control unit 29 by which the individual components of the device 1 can be controlled in a coordinated manner in order to implement the building process. The control unit can comprise a CPU, the operation of which is controlled by a computer program (software). The computer program can be stored separately from the device on a storage medium from which it can be loaded into the device, in particular into the control unit 29.

FIGS. 2a to 2f show steps of a method for producing a three-dimensional object by means of the device 1.

In a powder bed 30 formed by previous process steps, the solidified part of the object 2 to be produced is surrounded by powder 13 that remained unsolidified. Prior to the step shown in FIG. 2a, the recoating units 16a and 16b and the irradiation device 20 are arranged to the left of the build area 8.

For further building the object 2 layer by layer, the support 10 is first lowered by an amount that corresponds to the desired thickness of the layer. Then, as shown in FIG. 2a, building material 15 in powder form is applied in the form of a first further powder layer 31 upon the previously applied and selectively solidified powder layer 30 by means of a movement of the first recoating unit 16a in a first application direction R1. Application takes place at least over the entire cross-section of the object 2 to be produced, preferably over the entire build area 8, i.e. that region of the working plane 7 that can be lowered by a vertical movement of the support. During and after application of the first further powder layer 31, the applied powder is preheated by the radiant heater 17.

Then, as shown in FIG. 2b, the irradiation device 20 moves across the build area in a first irradiation direction, which irradiation direction is preferably equal to the first application direction R1, and selectively irradiates the first further powder layer 31. In doing so, the amount of energy introduced by the laser radiation 21 is set so that complete solidification of the building material in powder form takes place at those positions that correspond to the cross-section of the object 2 to be produced.

Then, as shown in FIG. 2b, the second recoating unit 16b performs an idle run in the first application direction R1, i.e. it moves across the build area 8 without applying building material 15.

Thereafter, the above-described steps are repeated in reverse direction.

First, the support 10 is lowered by an amount that corresponds to the desired thickness of the layer. Then, as shown in FIG. 2d, building material 15 in powder form is applied in the form of a second further powder layer 32 upon the previously applied and selectively solidified powder layer 31 by means of a movement of the second recoating unit 16b in a second application direction R2 opposite the first application direction R1.

The term "opposite" does not necessarily imply an angle of 180° when viewing the working plane from above, but only that the second application direction R2 has a component pointing in the opposite direction of the first application direction R1. Preferably, the angle between the first and second application directions is between 15 and 210 degrees, particularly preferred 180°.

Application of the second further powder layer 32 also takes place at least over the entire cross-section of the object 2 to be produced, preferably over the entire build area 8. The powder applied is preheated by the radiant heater 17 during and after application of the second further powder layer 32.

Then, as shown in FIG. 2e, the irradiation device 20 moves across the build area in a second irradiation direction, which is preferably equal to the second application direction R2, and selectively irradiates the second further powder layer 32. The amount of energy introduced by the laser radiation 21 is again set so that the building material 15 in powder form is completely solidified at those positions that correspond to the cross-section of the object 2 to be produced.

Afterwards, the first recoating unit performs an idle run across the build area 8 in the first application direction R1, as shown in FIG. 2f.

Thus, the initial state is reached again and the steps shown in FIGS. 2a to f are repeated until the object 2 is completed and can be removed from the process chamber 3 and freed from building material 13 that remained unsolidified. During the building process, the recoating units 16a and 16b repeatedly receive building material 15 in powder form from the storage containers 14a, 14b.

Since the recoating units 16a, 16b each require different height adjustments for the application of a powder layer and an idle run, they are arranged in the device 1 so as to be adjustable in height, in particular controllable in height.

Compared to the known prior art, the device 1 of the present embodiment is characterized in that a recoating unit 16a, 16b is arranged at each of the two sides of the irradiation unit 20. This makes it possible to operate the device as described above with reference to FIGS. 2a to f. This operation significantly reduces the time required for producing the object compared to the case in which only one recoating unit is arranged at one side of the irradiation device, thus increasing the productivity of the device.

In a modification of the method described above, the functions application run and idle run can also be interchanged. According to the procedure described above, the recoating unit 16a first carries out an idle run in the direction R2 according to FIG. 2f (of the previous cycle), then reverses and carries out an application run in the direction R1 according to FIG. 2a (of the following cycle). Likewise, the recoating unit 16b first carries out an idle run in the direction R1 according to FIG. 2c, then reverses and carries out an application run in the direction R2 according to FIG. 2d. Instead, one of the recoating units or both of them can carry out an application run before reversing and an idle run after reversing. As an additional effect, by doing so, the heating time that can be used for the heating process can be extended.

Figure 4:
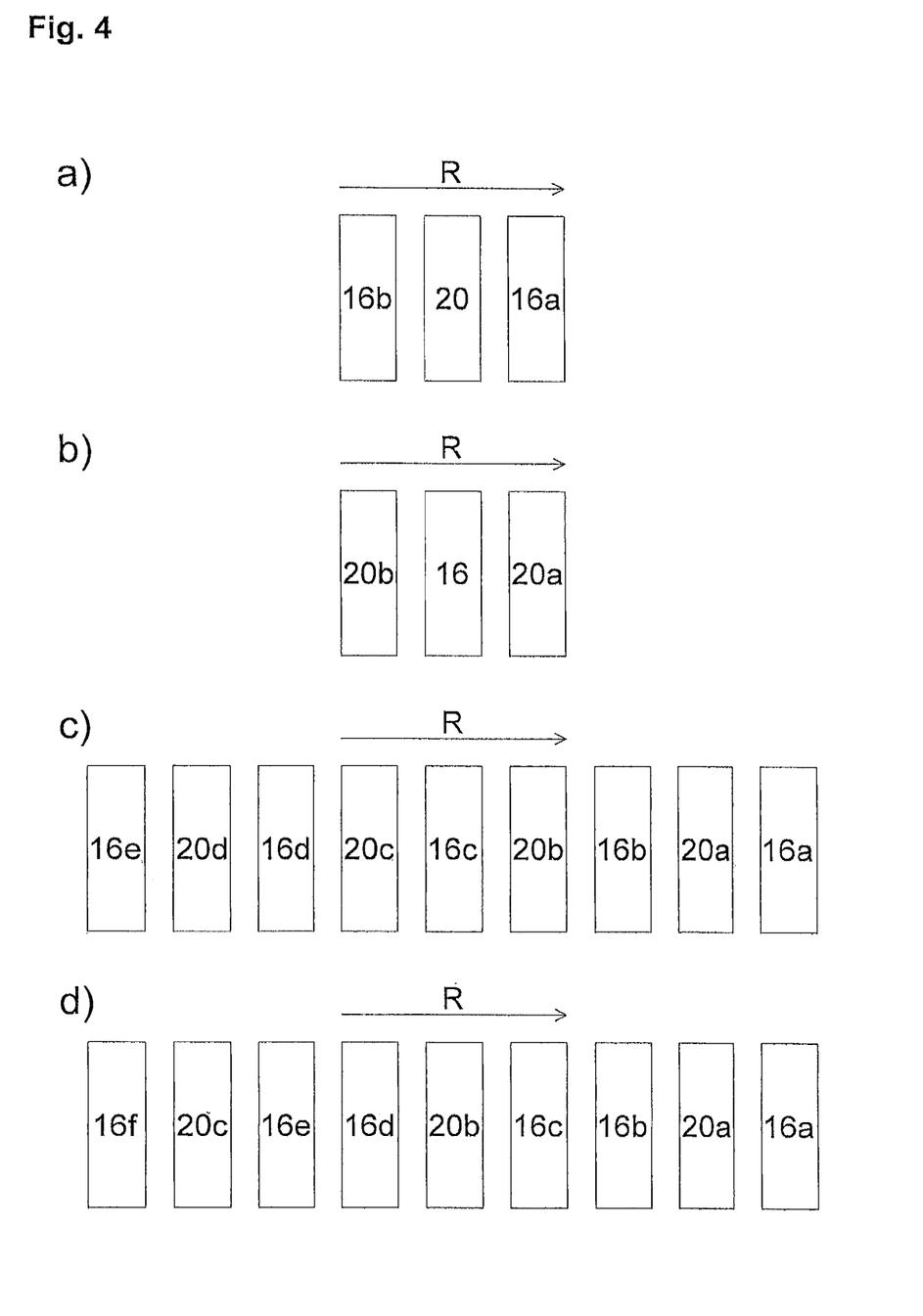
FIGS. 4a to 4d show schematic views of various modifications of the arrangements of recoating units and irradiation units from above.

In a further modification, one of the recoating units or both of them can also carry out an application run both before and after reversing, in which application run a powder sub-layer of reduced thickness is applied each time, wherein the sum of the thicknesses of the two powder sub-layers results in the desired total thickness of the powder layer. With such a double recoating (application of a powder layer to be solidified in the form of two successively applied powder sub-layers) there are advantages, as described below with reference to 4d, in particular when using recycling powder, such as an improvement in the quality of the objects produced.

FIGS. 3a and b show steps of an alternative method for producing a three-dimensional object by means of the device 1. This alternative method differs from the method shown in FIGS. 2a to f in that the irradiation device 20 and the recoating units 16a, 16b are moved together across the build area instead of separately from each other. All other features of the method described above can also be transferred to the alternative method.

FIG. 3a shows a process step in which the process steps shown in FIGS. 2a to c are combined with each other. The first recoating unit 16a moves in the first application direction R1 across the build area 8 and applies the first further powder layer 31, which is then preheated by the radiant heater 17. While the first recoating unit 16a is still moving across the build area, the irradiation device 21 already moves behind and at a distance to it also in the first application direction R1 across the already applied region of the first further powder layer 31 and selectively solidifies said region. At a distance behind the irradiation device, the second recoating unit 16b carries out an idle run in the first application direction R1.

FIG. 3b shows a repetition of the process step shown in FIG. 3a in opposite direction and represents a combination of the process steps shown in FIGS. 2d to f. The second recoating unit 16b applies the second further powder layer 32 in the second application direction R2, which second further powder layer is then preheated by the radiant heater 17. At a distance behind it, the irradiation device 21 also moves in the second application direction R2 across the already applied region of the second further powder layer 32 and selectively solidifies it. At a distance behind the irradiation device, the first application unit 16a carries out an idle run in the second application direction R2.

Thus, the initial state is reached again and the steps shown in FIGS. 3a and b are repeated until the object 2 is completed and can be removed from process chamber 3 and freed from building material 13 that remained unsolidified.

Since in this alternative method, one does not wait for one unit to move across the build area before the next unit starts its passage, an application process and a solidification process take place simultaneously at different locations of the build area. As a result, the time required for producing the object can be further reduced and the productivity can be further increased.

Here too, as with the modification of the method described with reference to FIG. 2, one of the recoating units or both of them can carry out an application run before reversing and carry out an idle run after reversing, or carry out an application run for a powder sub-layer of reduced thickness both before and after reversing.

FIGS. 4a to d show different modifications of the device shown in FIG. 1. These modifications differ from one another in the number and arrangement of the recoating units and irradiation units.

FIG. 4a schematically shows the arrangement shown in FIG. 1 in a view from above. The irradiation device 20 comprises a single irradiation unit, while the recoater 16 comprises two recoating units 16a, 16b which are arranged in the application direction R on both sides of the irradiation device, i.e. in front of and behind the irradiation device. So to speak, the recoating units are "mirrored" in their arrangement with respect to the irradiation device.

FIG. 4b shows a reversed arrangement. Instead of doubling the recoating unit and mirroring it with respect to the irradiation device, as in FIG. 4a, here the irradiation unit is doubled and mirrored with respect to the recoater. Thus, the recoater 16 in this case comprises a single recoating unit, while the irradiation device 20 comprises two irradiation units 20a, 20b which are arranged in the application direction R on both sides of the recoater, i.e. in front of and behind the recoater.

Figure 2:
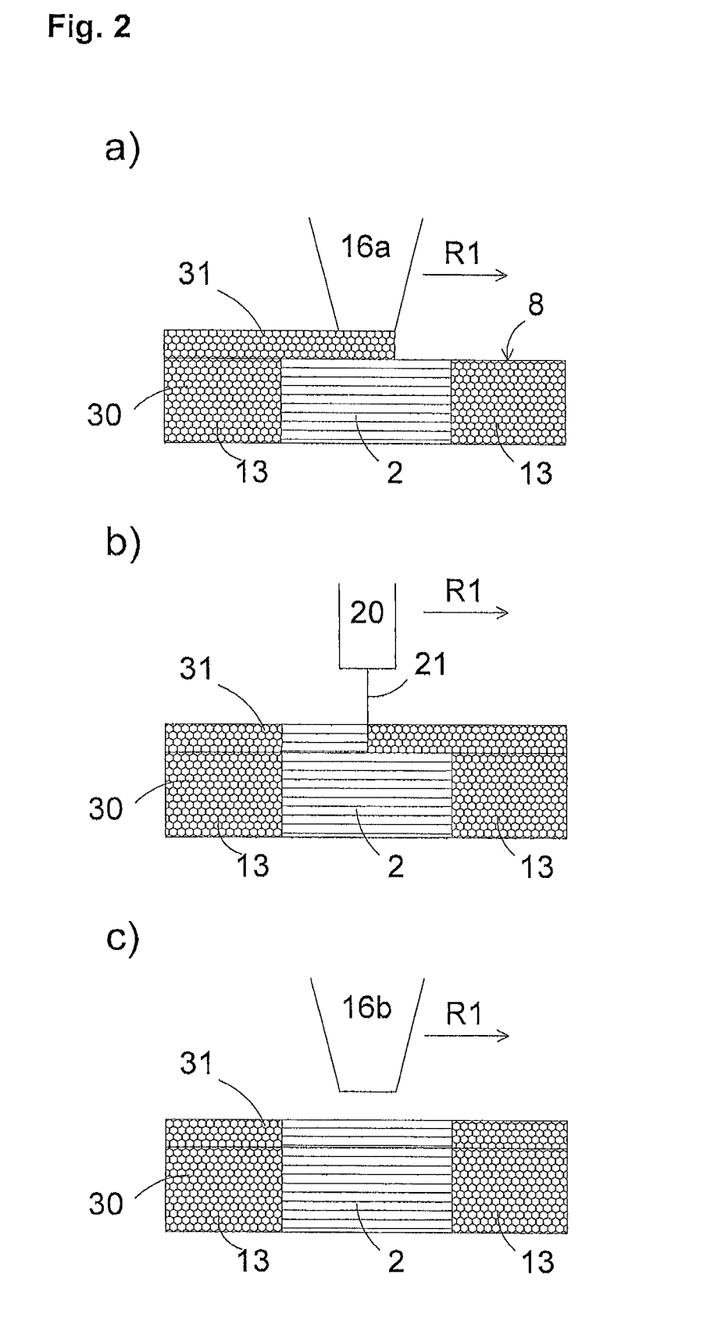
FIGS. 2a to 2f schematically depict a procedure of an exemplary embodiment of a method according to the invention for producing a three-dimensional object layer by layer using the device shown in FIG. 1.
Figure 3:
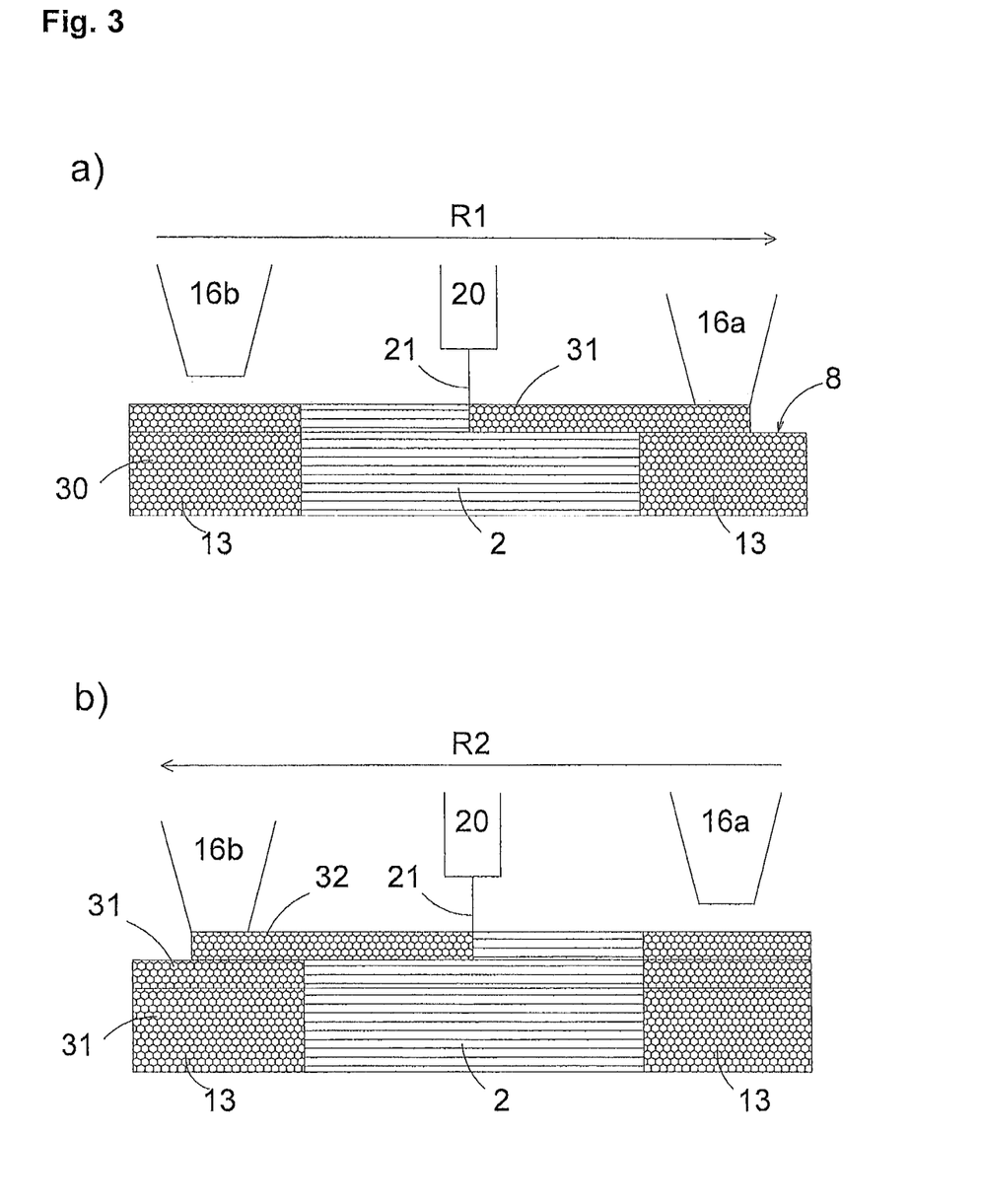
FIGS. 3a and 3b schematically depict a procedure of an alternative exemplary embodiment of a method according to the invention for producing a three-dimensional object layer by layer using the device shown in FIG. 1

The operation of a device with this arrangement is analogous to the operation shown in FIGS. 2 and 3 of the device shown in FIG. 1. During operation, for example, the respective preceding irradiation unit performs an idle run, the recoating unit applies the new powder layer, and the respective trailing irradiation unit implements the solidification of the newly applied powder layer.

Similar to the modification of the methods described with reference to FIGS. 2 and 3, one of the irradiation units or both of them can carry out an irradiation run before reversing and an idle run after reversing, or carry out an irradiation run of reduced energy both before and after reversing, wherein the total energy introduced in the two sub-irradiations is sufficient to solidify the building material.

Thus, also with this arrangement the time required for producing the object can be reduced and the productivity can be increased. However, due to the higher costs for an irradiation unit as compared to a recoating unit, preferably the recoating unit is doubled and mirrored as shown in FIG. 4a.

FIG. 4c shows an arrangement in which the recoater 16 comprises more than one recoating unit as well as the irradiation device 20 comprises more than one irradiation unit. The recoating units 16a-16e and the irradiation units 20a-20d are alternately arranged in the application direction such that each recoating unit (except for the ones arranged first and last) is surrounded by two irradiation units and each irradiation unit is surrounded by two recoating unit (except for the ones arranged first and last). Preferably, the total number of units is an odd number so that the two units located first and last in the application direction B are either both a recoating unit or both an irradiation unit. FIG. 4c shows the case in which said two units are both a recoating unit 16a, 16e, which is the preferred arrangement due to the higher costs for an irradiation unit.

The operation of a device with this arrangement is analogous to the operation shown in FIGS. 2 and 3 of the device shown in FIG. 1. At the beginning, all recoating and irradiation devices are arranged to the left of the build area 8 in the figure. First, the first recoating unit 16a moves across the build area 8 in the application direction R and applies a powder layer, which powder layer is then preheated by the radiant heater 17 and solidified by the first irradiation unit 20a. The second recoating unit 16b and the second irradiation unit 20b follow and so on until the last recoating unit 16e has finished its idle run across the build area 8. Then, the operation is repeated in the opposite direction in the reverse order. In doing so, the now foremost recoating unit 16e applies a powder layer, which powder layer is solidified by the irradiation unit 20d and so on, until the recoating unit 16a, which is now located at the rear, has finished its idle run across the build area 8.

Again, the individual units can be moved separately from one another, as shown in FIG. 2, or they can be moved together across the build area, as shown in FIG. 3. When moving separately from one another, the support 10 can be lowered by the desired layer thickness before application of each new powder layer. However, this is not possible when moving the units together across the build area. In this case, the recoating units 16a-16e and the irradiation units 20a-20d are arranged in the device 1 so as to be adjustable in height, in particular controllable in their height. When moving across the build area 8, each recoating unit is then set higher by a predefined amount, preferably by the amount corresponding to a layer thickness of the building material, than the recoating unit preceding in the respective direction of movement.

Similarly, each irradiation unit is set higher by a predefined amount, preferably by the amount corresponding to a layer thickness of the building material, than the irradiation unit preceding in the respective direction of movement. Alternatively or in addition to a height adjustment of the irradiation unit, a focal plane of the emitted radiation of each irradiation unit can be set higher by a predefined amount, preferably by an amount corresponding to a layer thickness of the building material, than the focal plane of the irradiation unit preceding in the respective direction of movement.

In a device in which successive layers are applied in different directions, between the application of the two layers, both the recoater and the irradiation device must be decelerated to a standstill, the direction of the drive must be reversed and then accelerated again to the required operating speed. This represents an idle time that cannot be used for productive operation of the device.

By alternately arranging several recoating and irradiation units one behind the other, several layers can be applied and solidified before such a reversal is required. As a result, the time required for reversal is less significant than when reversal is required after application and solidification of each layer. As a result, the time required for producing the object can be further reduced and the productivity can be further increased.

Again, as in the modification of the method described with reference to FIG. 2, one of the recoating units or both of them can carry out an application run before reversing and an idle run after reversing, or carry out an application run for a powder sub-layer of reduced thickness both before and after reversing.

FIG. 4d shows an arrangement similar to FIG. 4c, except that here two recoating units 16b-16e are arranged between each irradiation unit 20a-20c. Again, the preferred arrangement is shown, in which the two units located first and last in the application direction B are both a recoating unit 16a, 16f.

The operation of a device with this arrangement is analogous to the operation of the device shown in FIG. 4c. However, in this case, each powder layer to be solidified consists of two successively applied powder sub-layers, which sub-layers are then irradiated together and thus solidified. In doing so, the respective first powder sub-layer is heated by the radiant heater before the respective second powder sub-layer is applied. Said second sub-layer is in turn heated by the radiant heater before the first and second powder sub-layers are irradiated together and thus selectively solidified.

The application of a powder layer to be solidified in the form of two powder sub-layers applied one after the other (double recoating) is implemented each time by two recoating units moving across the build area before the next irradiation unit is moved across the build area. In this arrangement, the respective trailing recoating unit does not perform an idle run, but applies the first powder sub-layer during its first movement across the build area and applies the second powder sub-layer during its second movement in the opposite direction. Thus, double recoating can already be realized by the arrangement shown in FIG. 4a.

Here, too, the individual units can be moved separately from one another, as shown in FIG. 2, or they can be moved together across the build area, as shown in FIG. 3, and the recoating units 16a-16f and the irradiation units 20a-20c are arranged in the device 1 so as to be adjustable in height, in particular controllable in their height, and/or the focal plane of the emitted radiation of the irradiation units 20a-20c is adjustable. In this case, when moving across the build area 8, each recoating unit is preferably set higher by the amount corresponding to a layer thickness of the building material than the recoating unit preceding in the respective direction of movement and each irradiation unit (or its focal plane) is preferably set higher by the amount corresponding to a layer thickness of a total powder layer formed of two powder sub-layers than the focal plane of the irradiation unit preceding in the respective direction of movement.

Double recoating has advantages in particular when using recycling powder, which recycling powder was already used in an earlier production of an object and remained as unsolidified building material. From a certain proportion of recycling powder contained in the building material on, the quality of the objects produced may decrease. By separately heating the individual powder sub-layers during double recoating, a more homogeneous temperature distribution can be achieved which leads to an improvement in the quality of the objects produced or allows for a higher proportion of recycling powder at a constant quality of the objects and thus provides for a more profitable production.

By means of the arrangement shown in FIG. 4d, also for double recoating the time required for producing the object can be reduced and the productivity can be increased.

Instead of two recoating units, also more recoating units can be arranged between an irradiation unit, wherein application of a powder layer to be solidified is implemented in the form of more than two powder sub-layers applied one after the other.

Features of these arrangements can, if applicable, be combined among each other. For example, an arrangement is possible in which in some cases only one recoating unit is arranged between two irradiation units and in some cases two or more recoating unit are arranged between two irradiation units.

Even though the present invention was described with regard to a laser sintering device or a laser melting device, it is not restricted to laser sintering or laser melting. It can be applied to any method for producing a three-dimensional object by layer-wise applying and selectively solidifying a building material in powder form by selectively introducing energy.

The irradiation device can comprise, for example, one or several gas or solid state lasers or any other kinds of laser, such as laser diodes, in particular VCSEL (Vertical Cavity Surface Emitting Laser) or VECSEL (Vertical External Cavity Surface Emitting Laser). In general, any device may be used as an irradiation device with which energy can be selectively introduced as wave or particle radiation to a layer of the building material. Instead of a laser, for example, a different light source, an electron beam or any other source of energy or radiation can be used which is suited to solidify the building material.

Instead of introducing energy, the selective solidification of the applied building material can also be implemented by means of 3D printing, for example by applying an adhesive. In general, the invention relates to producing an object by means of applying, layer by layer, and selectively solidifying a building material regardless of the manner in which the building material is solidified.

Various kinds of building material can be used, in particular powders, such as metal powders, plastic powders, ceramic powders, sand, filled or mixed powders.

The invention claimed is:

1. A device for producing a three-dimensional object by layer-wise applying and selectively solidifying a building material, the device comprising:
   a recoater that can be moved in an application direction across a build area, the recoater having at least a first recoating unit for applying a layer of the building material to the build area; and
   a solidification device that can be moved in the application direction across the build area, the solidification device having at least first and second solidification units for selectively solidifying the applied layer of the building material at positions that correspond to a cross-section of the three-dimensional object to be produced,
   wherein the device is configured and/or controlled to repeat the steps of applying and selectively solidifying until the three-dimensional object is completed;
   wherein the recoater comprises at least a second recoating unit that is arranged at an opposite side of the first solidification unit than the first recoating unit in the application direction; and/or wherein the second solidification unit is arranged at an opposite side of the first recoating unit than the first solidification unit with respect to the application direction;
   wherein the solidification device is an irradiation device and the first and second solidification units are irradiation units that are adapted to emit a radiation suitable for solidifying the building material; and
   wherein a focal plane of emitted radiation of each of the first and second solidification units is adjustable and is set higher by a predefined distance than the focal plane of the solidification unit preceding in a respective direction of movement.

2. The device according to claim 1, wherein the recoater includes at least first and second recoating units,
   wherein the recoating units and the solidification units are arranged alternately in the application direction; and
   wherein both units that are arranged first and last in the application direction are either both a recoating unit or both a solidification unit.

3. The device according to claim 1, wherein the recoater includes at least first and second recoating units,
   wherein, with respect to the application direction, at least one of the recoating units is arranged between two of the solidification units; and
   wherein both units that are arranged first and last in the application direction each are recoating units.

4. The device according to claim 1, wherein a number of the recoating units is larger than a number of the solidification units.

5. The device according to claim 1, wherein the recoater is configured to apply a layer of the building material to the build area both upon moving in the application direction as well as upon moving in a direction opposite the application direction.

6. The device according to claim 1, wherein the solidification device is configured to solidify the applied layer of the building material both upon moving in the application direction as well as upon moving in a direction opposite the application direction and/or
   wherein at least the first recoating unit is arranged in the device so as to be adjustable in height; and/or
   wherein at least the first solidification unit is arranged in the device so as to be adjustable in height.

7. The device according to claim 1, wherein at least the first irradiation unit is designed as at least one bar irradiation device.

8. The device according to claim 7, wherein the at least one bar irradiation device is designed as VCSEL-based or as VECSEL-based bar irradiation device.

9. The device according to claim 1, further comprising a height-adjustable support intended to support the applied layers.

10. The device according to claim 1, further comprising a radiant heater for heating the applied layer before solidification.

* * * * *